E. S. HUTTON.
MACHINE FOR MAKING HOLLOW GLASSWARE.
APPLICATION FILED AUG. 2, 1919.
1,394,092.
Patented Oct. 18, 1921.
10 SHEETS—SHEET 6.
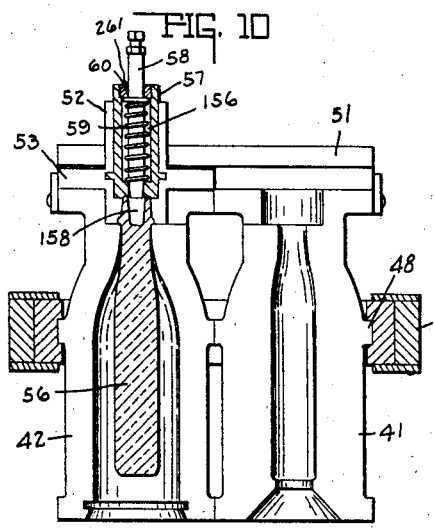
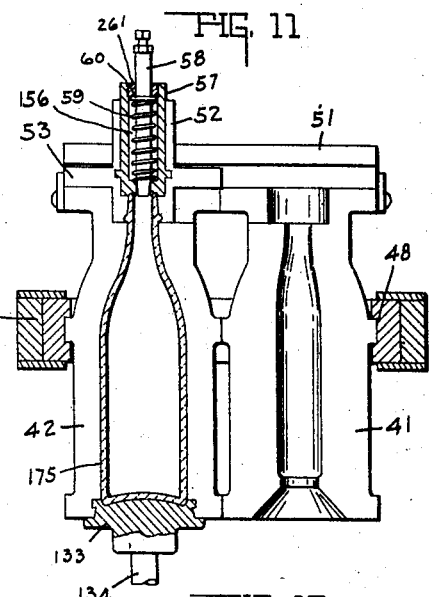
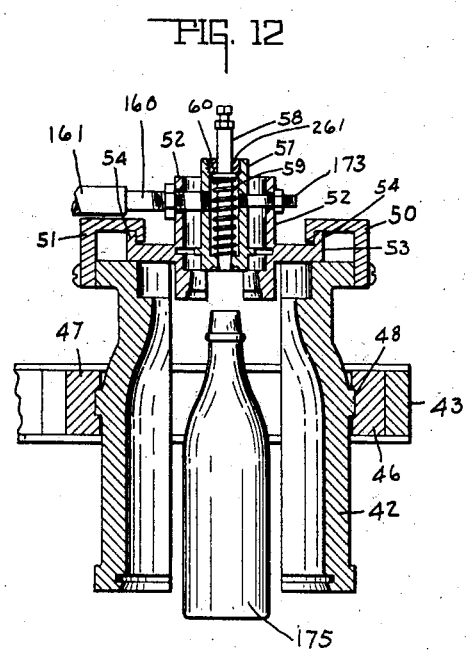
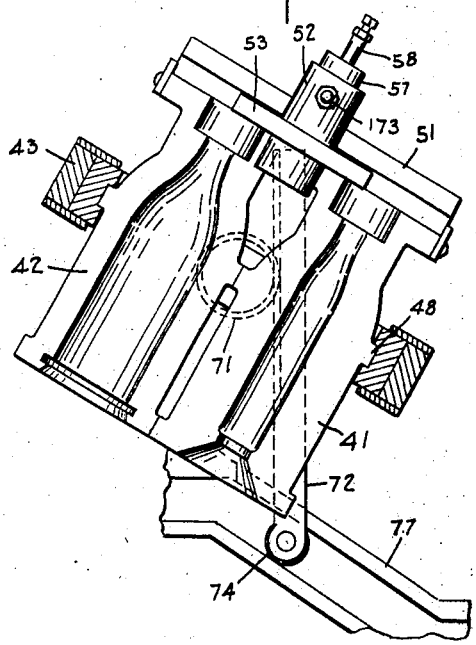
INVENTOR.
EDWARD S. HUTTON.
BY
Lockwood & Lockwood
ATTORNEYS.

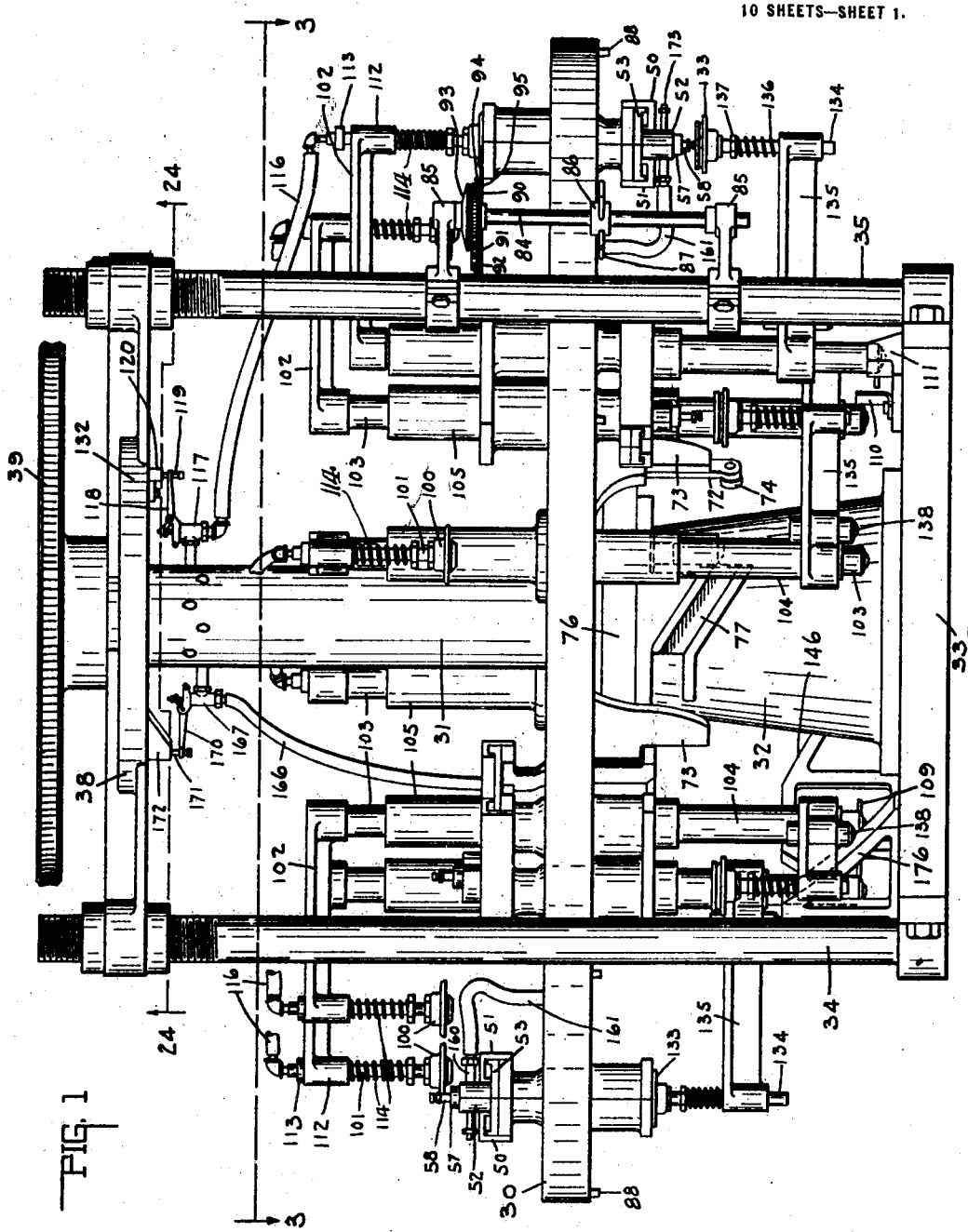

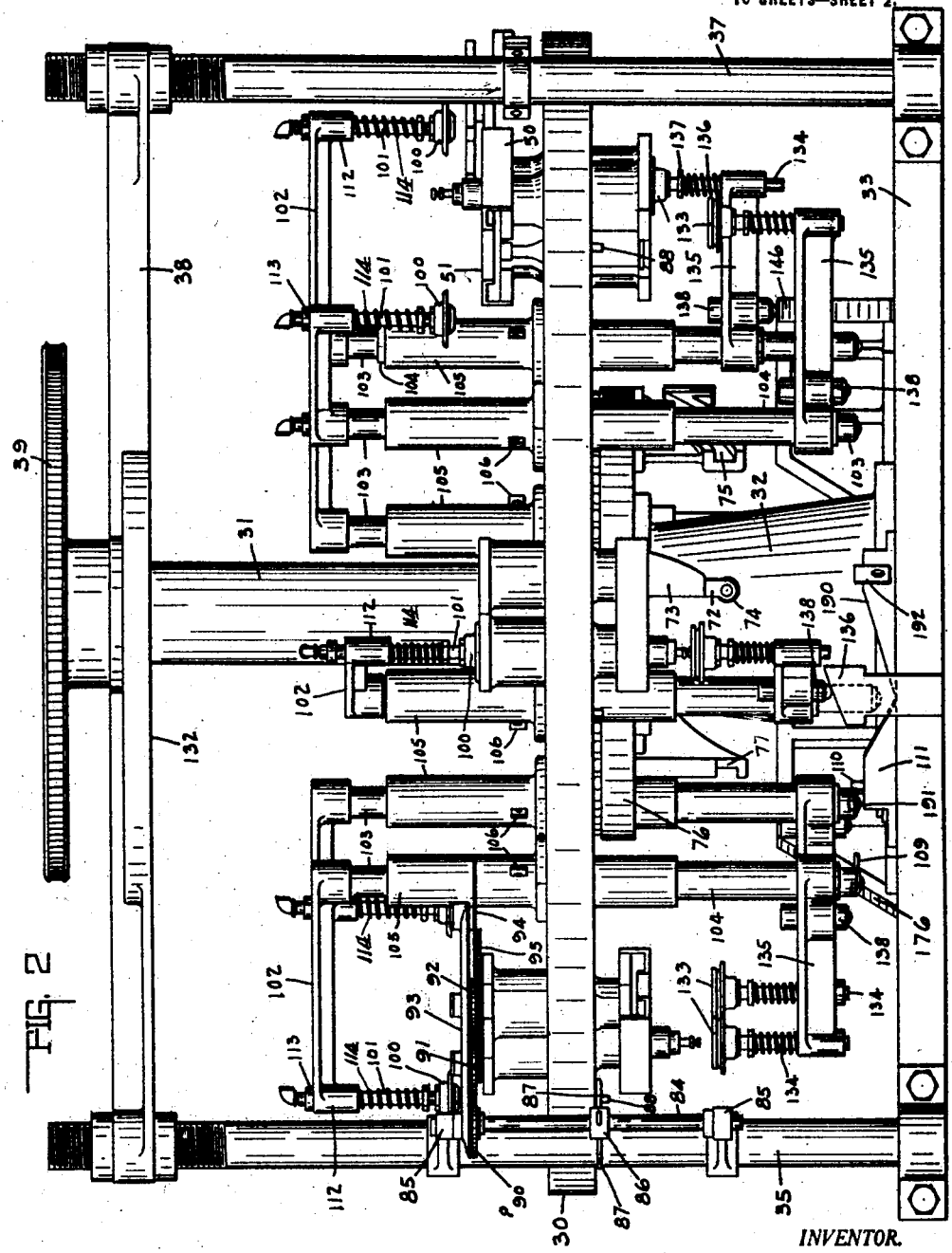

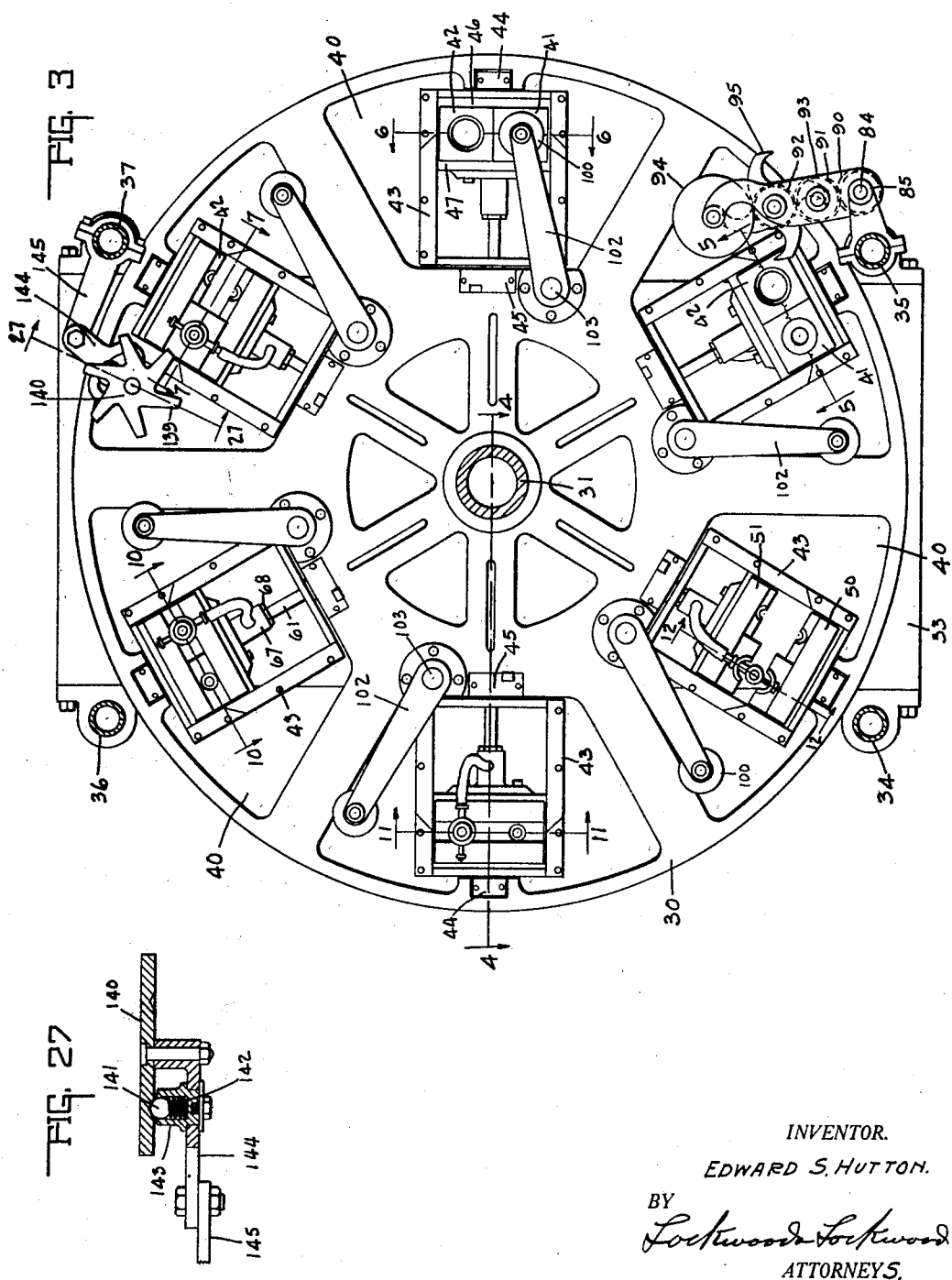

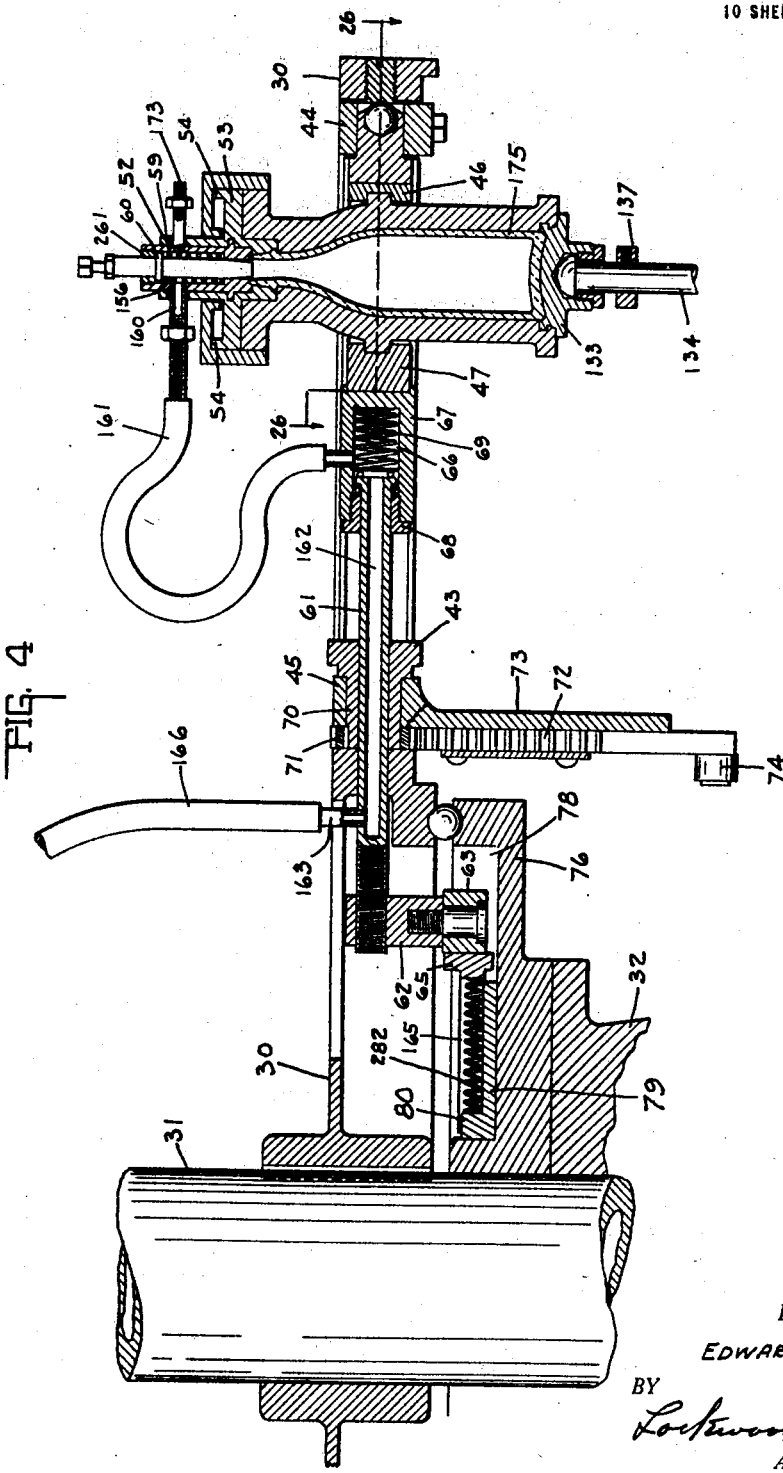

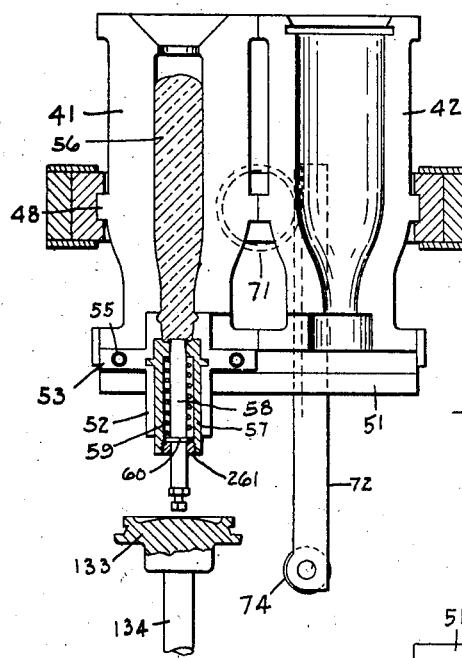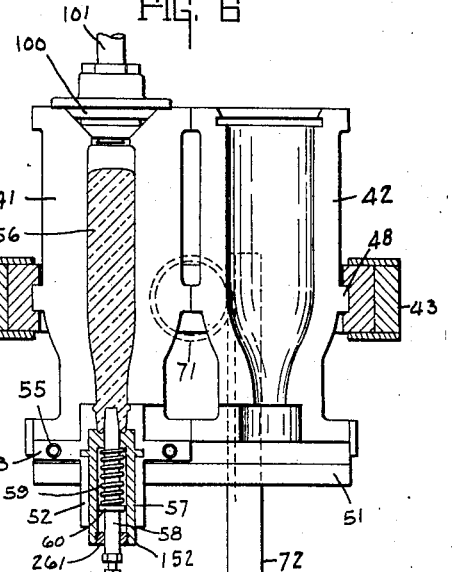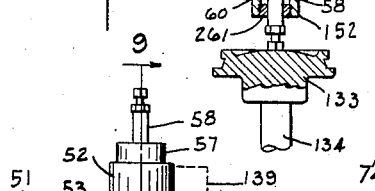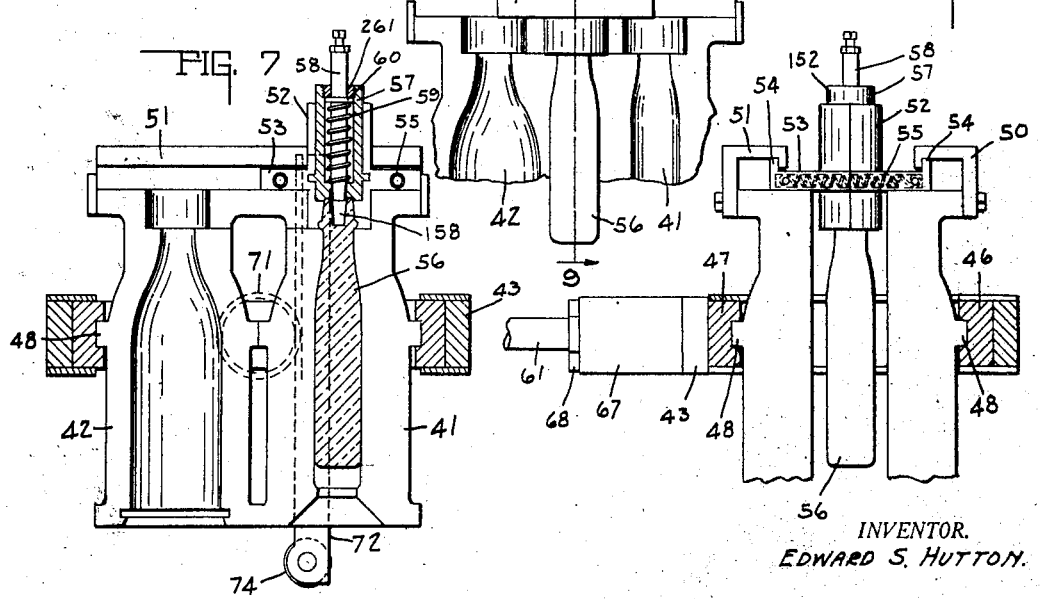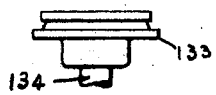

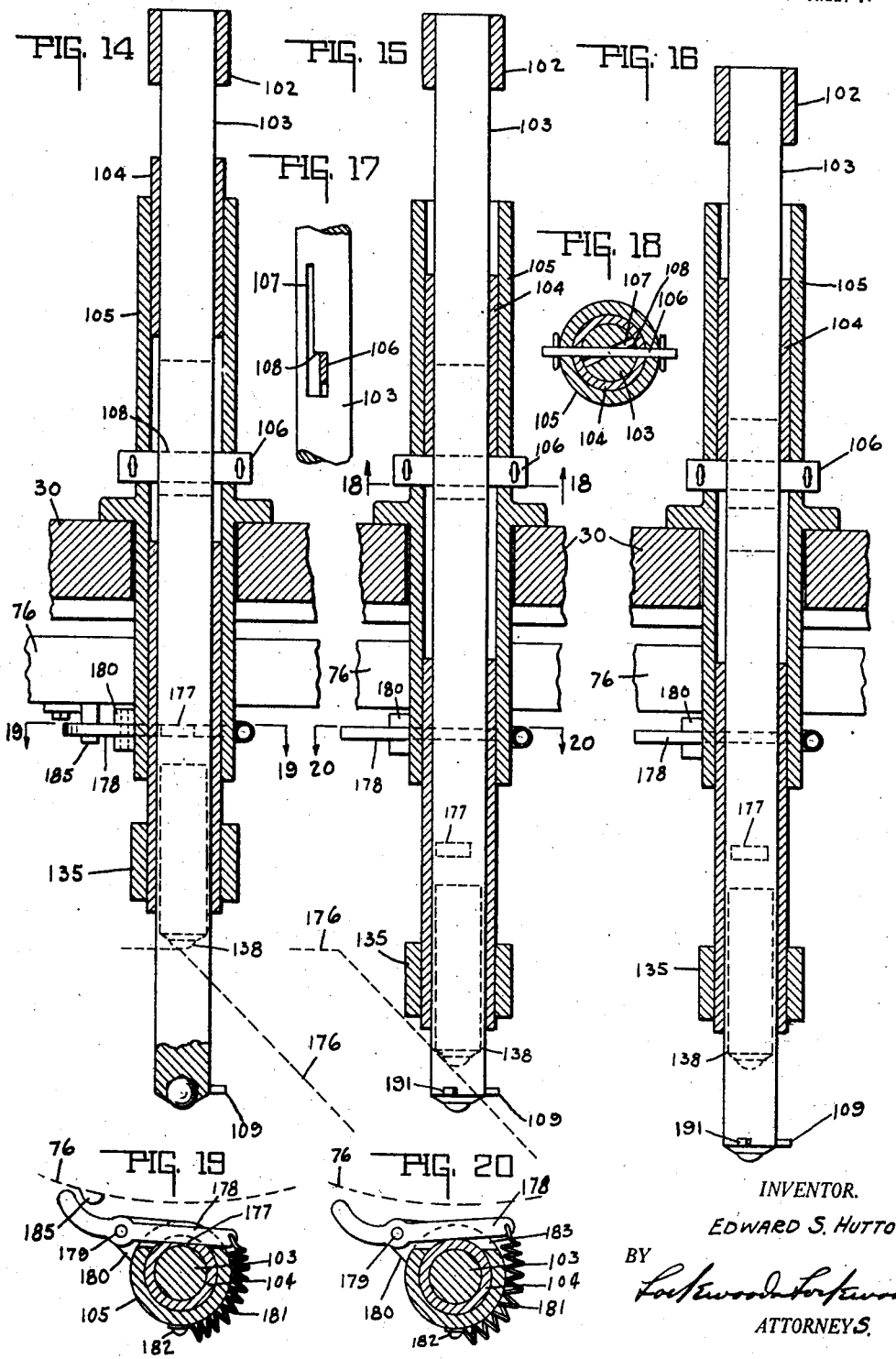

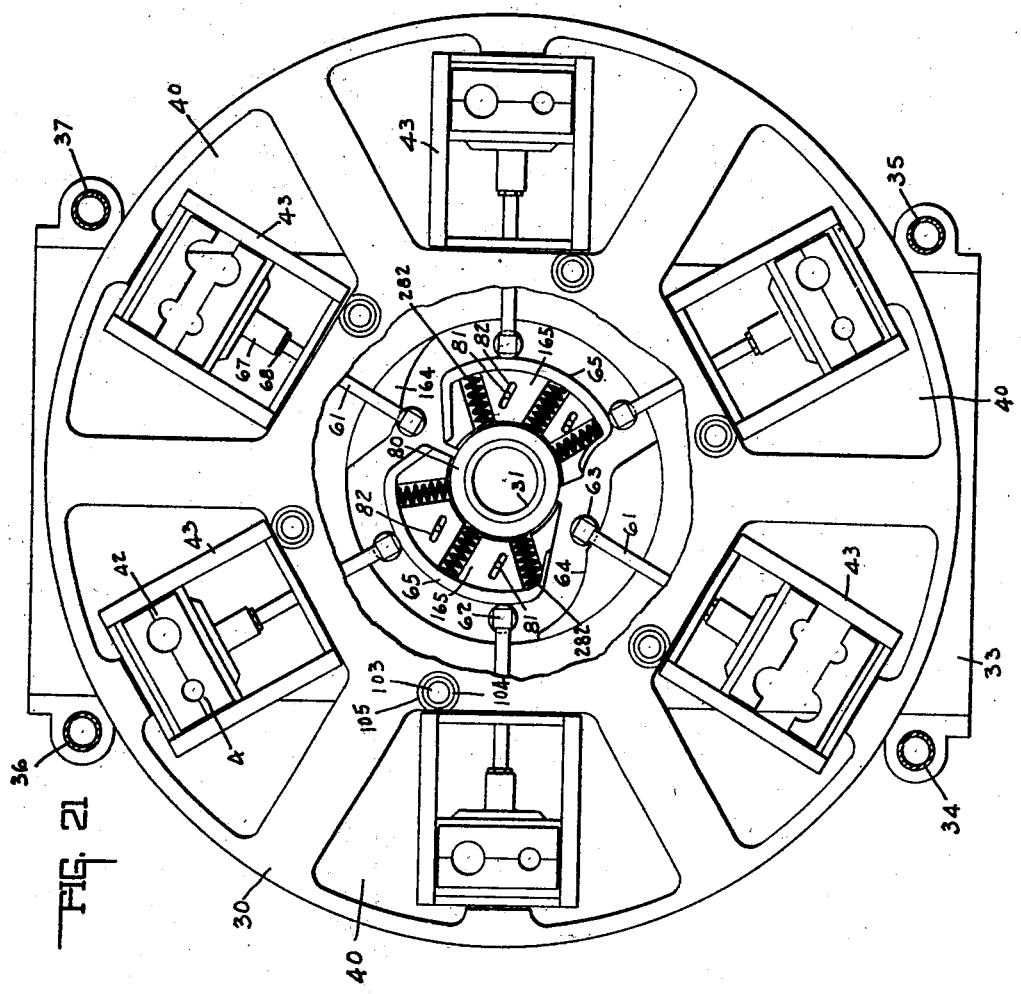

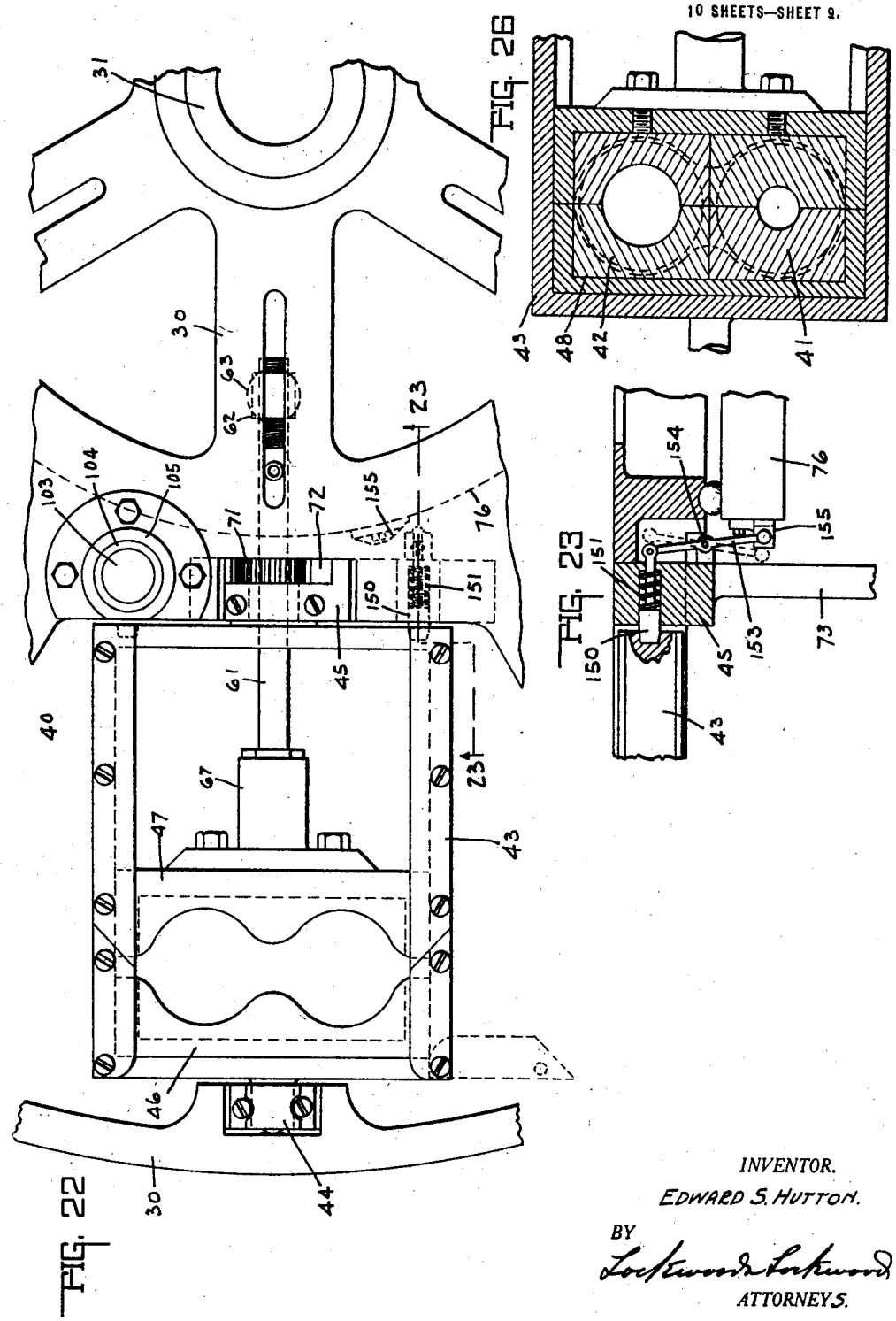

E. S. HUTTON.
MACHINE FOR MAKING HOLLOW GLASSWARE.
APPLICATION FILED AUG. 2, 1919.
1,394,092.
Patented Oct. 18, 1921.
10 SHEETS—SHEET 10.
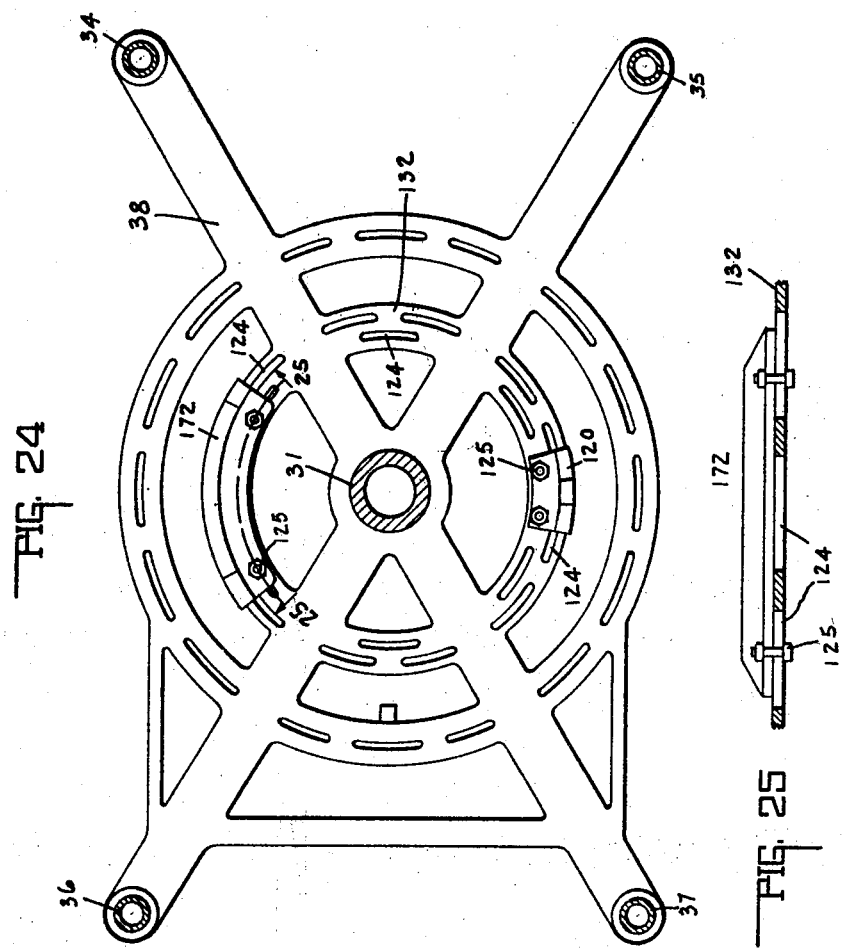
INVENTOR.
EDWARD S. HUTTON
BY
Lockwood & Lockwood
ATTORNEYS.

UNITED STATES PATENT OFFICE.

EDWARD S. HUTTON, OF LAPEL, INDIANA.

MACHINE FOR MAKING HOLLOW GLASSWARE.

1,394,092.  Specification of Letters Patent.  Patented Oct. 18, 1921.

Application filed August 2, 1919. Serial No. 314,853.

*To all whom it may concern:*

Be it known that I, EDWARD S. HUTTON, a citizen of the United States, and a resident of Lapel, county of Madison and State of Indiana, have invented a certain new and useful Machine for Making Hollow Glassware; and I do hereby declare that the following is a full, clear, and exact description thereof, reference being had to the accompanying drawings, in which like numerals refer to like parts.

The object of this invention is to improve the construction and operation of mechanism for making hollow glassware, set forth in my former Letters Patent No. 1,241,516 dated October 2, 1917, and No. 1,253,246, dated January 15, 1918. There are various new features constituting the improvements of said mechanism as appear hereafter, whereby several defects of the construction in my former patents are overcome, and the automatic operation of the machine rendered more practical and satisfactory.

The full nature of the invention will be understood from the accompanying drawings and the following description and claims.

Figure 1 is an end elevation of the machine, parts being omitted. Fig. 2 is a side elevation thereof. Fig. 3 is a section on the line 3—3 of Fig. 1. Fig. 4 is a section on line 4—4 of Fig. 3, showing the parts in position when the blowing of the bottle is completed. Fig. 5 is a section on line 5—5 of Fig. 3, showing the parts in position when the gather of glass has been inserted in the blank mold. Fig. 6 is a section on line 6—6 of Fig. 3, showing the parts in another position when the blank in the blank mold is completed. Fig. 7 is a section on line 7—7 of Fig. 3, showing the parts in position when the mold has been inverted. Fig. 8 is an elevation of the inner side of half of a combined blank and blow mold, and of the means for shifting the blank from the blank mold to the blow mold, parts being broken away and a blank being shown about midway its movement from the blank mold to the blow mold. Fig. 9 is a section of the device along line 9—9 of Fig. 8.

Fig. 10 is a section on the line 10—10 of Fig. 3, with the parts in position showing the blank after it has been introduced into the blow mold and before it has been blown. Fig. 11 is a section on line 11—11 of Fig. 3, showing the parts in position when a blank has been blown. Fig. 12 is a section on the line 12—12 of Fig. 3, showing the parts in position during the discharge of the completed bottle. Fig. 13 is an elevation of a section of the parts of half of a mold unit as the same is being changed from the position shown in Fig. 12 to that shown in Fig. 5. Fig. 14 is a central longitudinal section of the rod for controlling the movement of the blow head of the blank mold and parts associated therewith, an actuating cam being shown by dotted lines. Fig. 15 is the same as Fig. 14 with the parts in altered position. Fig. 16 is the same with the parts in still another position. Fig. 17 is an elevation of a portion of the lever and actuating rod. Fig. 18 is a section on line 18—18 of Fig. 15. Fig. 19 is a section on line 19—19 of Fig. 14.

Fig. 20 is a section on line 20—20 of Fig. 15. Fig. 21 is the same as Fig. 3 with parts omitted and the central portion broken away showing the parts beneath. Fig. 22 is a plan view of the operation of the table and the mold structure, parts being omitted and parts being broken away. Fig. 23 is a section on line 23—23 of Fig. 22. Fig. 24 is a section on the line 24—24 of Fig. 1. Fig. 25 is a section on the line 25—25 of Fig. 24. Fig. 26 is a horizontal section through the mold unit on the line 26—26 of Fig. 4. Fig. 27 is a side elevation of the mold shifting means.

In the drawings herein is shown a glass machine having a mold table 30 secured on a rotatable hollow column 31 which is rotatably mounted in the stand 32, supported upon a base 33. Posts 34, 35, 36 and 37 are mounted in the base and extend upward as shown in Figs. 1, 2 and 3. Said posts have secured upon their upper ends a horizontal frame 38 and above it a drive wheel 39 is secured to the upper end of the column 31. Said drive wheel 39 receives its power from any suitable source of power.

The mold table 30, as seen in Fig. 3, carries six sets of molds, although any number of sets may be employed. These molds are located in spaces 40 in said table. The theory of the operation of this machine is that the table rotates continuously while the machine is in use. There is a press mold 41 and a blow mold 42 in each mold unit. These molds are located side by side and each of them is formed of two halves, being cut on a plane that cuts both of said molds, as seen in Fig. 3.

The molds are mounted in a rotatable frame 43 which is carried at its outer end by a bearing 44 and its other end in a bearing 45 in the table 30. The two sides of said frame are formed as shown in Fig. 7 with horizontal guideways, see Figs. 3 and 22. In the outer end of the frame a block 46 is rigidly secured and the frame carries a block 47 slidable in the guideways in said frame 43, the adjacent faces of said two blocks being curved so as to surround the body of the mold and being recessed to receive rectangular ribs 48 on each mold as seen in Fig. 26. Therefore, the half of the press mold and the half of the blow mold is held, by the block 46, stationary during the operation of the machine, although they can be removed by hand when desired. The other halves of said molds are carried by the block 47, and the block 47 is reciprocable in the frame 43 radially of the table so that the inner half of the molds can be moved away from the outer half of the molds, as clearly shown in Fig. 9.

On the top of the outer mold sections a guide-plate 50 is secured and on top of the inner mold halves a corresponding guide-plate 51 is secured and the tops of the molds are flat as seen in Fig. 9. A head 52 and a head plate 53 are formed as shown in Fig. 9, of two halves and the head plate 53 has ribs 54 on its lateral edges so as to be slidable in the guideways 50 transversely of the mold frame, and assume the different positions shown in Figs. 5, 8, 10 and 13. The width of the guideplates 50 and 51 is sufficient to permit the two sets of mold halves to be separated as seen in Fig. 9, and the ribs 54 in which corresponding ribs of the guideways prevent the escape of the plate 53 and maintain its central position between said two mold sections as there shown. The two halves of the head 52 and plate 53 are held together by the springs 55.

The head 52, as shown in Fig. 5, has its inner end formed to constitute a neck mold for the glass blank 56 and it is provided with a chamber for receiving a cylinder 57 in which the blank forming plunger 58 is mounted. The plunger is given its return movement by a spiral spring 59 lying within the cylinder 57 and acting against a collar 60 on the plunger, and such return movement of the plunger is limited by a nut 261, see Fig. 5. One end of the plunger extends outward so as to be actuated by means hereafter described.

The inner set of mold halves carried by the block 47 are moved forward and separated from the other set, for opening the molds, by means of a hollow tube 61 connected therewith, and extending radially of the machine, as shown in Figs. 4 and 21, which is slidably mounted in the table as shown in Fig. 4. On its inner end a block 62 is secured that lies just beneath the table 30 and its lower end carries a roller 63 which is adapted to be engaged by stationary cams 64 and 164 and cams 65, as seen in Fig. 21. The cams 64 and 164 move said rod 61 and the inner mold section inward, while the cams 65 move the same outward, as shown.

The hollow rod 61 is mounted in a recess 66 in the member 67 which is secured to the block 47, as seen in Fig. 22, so that said member 67 and block 47 can rotate. An air tight joint between them however is provided by a packing nut 68, and in the chamber 66 as a spiral spring 69 which serves as a cushion to force the block 47 and the mold halves carried thereby outward to make a tight joint between the mold sections when they are brought together.

The mold unit is given a half revolution by the following means. The inner end of the mold form 43 has a sleeve 70, see Fig. 4, rotatably mounted in the bearing 45 and having secured on it a gearwheel or pinion 71 adapted to be engaged and actuated by a rack bar 72 vertically movable in the plate 73 which extends down from said bearing 45, and which is stationary with and rigidly connected with the table 30. The rack bar 72 carries a roller 74 at its lower end which is adapted at one point in the revolution of the table to be forced upwardly by the cam 75 which extends down from and is secured to the bearing plate 76, and at another point to be forced downwardly by the cam 77. One of these movements causes the mold unit to be given a half revolution after the glass blank has been formed and another half revolution after the glass article has been blown, as seen in Fig. 13. When the mold frame is thus turned, it is locked in position by the means shown in Figs. 22 and 23. A locking pin 150 engages a notch in the mold frame 43, said pin 150 being mounted in the bearing 45 and rests and is held in locking position by a spring 151. The pin is disengaged to permit the revolution of the mold frame by the lever 153, which is fulcrumed between its ends at 154, and at its lower end is engaged at the proper time by a pin 155 projecting radially from the periphery of the bearing weight 76.

The cam members 65 are on opposite sides of the axis of the table, mounted so as to be radially movable, as shown in Figs. 21 and 4. The bearing plate 76, as seen in Fig. 4, has central recesses 78 and in it an annular plate 79 is located, having a shoulder 80 and pins 81 extending up from the plate 79 through slots 82 in a cam plate 156. Said cams are forced outward radially by a plurality of springs 282 lying on the plate 165 between the cams 65 and the shoulder 80 on the plate 79, said springs 282 therefore force the cams radially outward and also the rods 61, and in addition to the springs 69 help to hold the mold sections closed when desired, as shown in four sets of the molds in Fig. 21.

*Operation and operative parts.*

*Forming the blank.*—In forming the glass blank 56, the molds are in the position shown in Fig. 5, with the blank mold 41 with its mouth downward. The upper end of the mold has a conical opening through which the gathering of glass is inserted. The lower end of the mold 41 coöperates with the upper end of the neck mold, that is the upper end of the head 52 and the upper end of the cylinder 57 and plunger 59 close the lower end of the neck mold.

The next step is to introduce compressed air into the upper end of the blank mold 41. At this stage the molds are located at the lower right hand corner of the table as shown in Fig. 3. Then as the table is rotated the gather of glass is cut off by the cut-off mechanism shown at the lower right hand corner of Fig. 3.

The cut-off mechanism includes a shaft 84, seen in Fig. 2 and mounted in bearings 85, which are secured to the post 35 and said shaft has secured on it a collar 86 having pins 87 extending therefrom. There are four of these equal distances apart and they project immediately under the table 30 and they are engaged and actuated by a pin 88 extending down from the table, there being one of these pins 88 for each set of molds, and the arrangement is such that the pins will cause the shaft 84 to be turned one-fourth a revolution. The shaft 84 has secured on it a gear 90 that meshes with a gear 91, which in turn meshes with a gear 92, both of which gears 91 and 92 are mounted in a plate 93 secured to the bearing 85 projecting inward as shown in Fig. 3 immediately over the path of the upward ends of the molds.

The inner end of the plate 93 carries a rotatably mounted round cutter or disk 94, and in position for its edges to be engaged by the glass extending upward from the blank mold after the gather has been inserted. One of the knives of the knifing member 95 coöperates with the cutting disk 94 to sever the glass. This knife is secured to the last mentioned gear 92 and is driven by the quarter turns of the shaft 84 as hereinafter explained. The member 95 has four of these knives equal distances apart and curved concavely so as to coöperate with the convex curvature of the disk 94.

The next step is illustrated in Fig. 6 and at the right hand side of Fig. 3. The blow head 100 on the tube 101 is carried by the arm 102 that is mounted on the vertically reciprocable rod 103, see Fig. 2. The rod 103 reciprocates in the tube 104 which is vertically movable in the fixed tube 105 which is mounted on the table. A cross bar 106 is secured in the bearing tube 105 and extends through a slot 107, see Fig. 17, which is widened at its lower end to form a shoulder 108. Normally the rod 103 is supported in an elevated position by said bar 106 and shoulder 108, as shown in Fig. 14. When the time arrives for bringing the blow head 100 down upon the mold as shown in Fig. 6, a pin 109 extending laterally from the rod 103 is engaged by the stud 110 extending upward from the cam block 111, seen best in Fig. 2. This gives the rod 103 a slight turning movement and thus turns the arm 102 from the position shown in the lower part of Fig. 3 a few degrees so as to bring it into the position shown in the right hand of Fig. 3 and that turns the rod 103 off of its supporting bar 106, see Fig. 17, and then the rod 103 drops down by gravity to the position shown in Fig. 16, which brings the blow head 100 into the position to close the upper end of the blank mold 41.

Air is supplied to the blow head at this stage of the operation by the following means. The air pipe 101, see Fig. 1, is vertically movable in the bearing 112 in the arm 102 hereinafter described. The collar 113 limits the downward movement of the air head under the action of the spring 114 surrounding the tube 101 lying between the bearing 112 and the collar 113 located on the tube 101. The air is supplied to the tube 101 through a flexible tube 116 leading to the valve 117 which is secured to, and in communication with the air column 31 which is supplied with compressed air from a suitable source, and which supplies compressed air for all parts of the machine. The valve is controlled or opened by an arm 118 which has at its outer end a set screw 119 in position to be engaged by the cam 120 on the under side of the cam holding plate 132 which constitutes a part of the frame 38. The cam 120 is adjustably held in slots 124, see Fig. 24, by bolts 125, see Fig. 25.

The plunger for pressing the inside of the neck and making an air opening is operated immediately after the air has entered the upper end of the press mold 41, and as shown in Fig. 6, the plunger is actuated by the blow mold bottom 133 on the rod 134 which is mounted at its lower end in an arm 135, as seen at the right hand lower corner of Fig. 1, and is supported by a spring 136 around said rod, and lying between the arm 135 and the collar 137 on said rod.

The arm 135 as seen in Figs. 1 and 14, is secured to the lower end of the tube 104, and as seen in Fig. 2, is elevated by the pin 138 secured in said arm 135 coming in engagement with the short cam 136 near the middle of the lower part of Fig. 2, to sufficiently enter and actuate the plunger, as seen in Fig. 6, and then it immediately drops back into the position shown in Fig. 5.

While the table is moving a mold structure from the right side to the upper right side as shown in Fig. 3, the blow head 100 is elevated from the position shown in Fig. 6 by the cam 190, see middle portion of Fig. 2, engaging the lower end of the rod 103 and elevating it, and in that movement the pin 191 extending from said rod engages a stud 192 on said cam, which causes a slight turning movement of the rod for locking it in its elevated position and holding it up, as seen in Fig. 17.

*Blowing the article.*—After the blank has been formed as described, the first thing done is the inversion of the molds by the means hereafter described, and while the molds shown at the right hand side of Fig. 3 moves to the upper right hand corner thereof, thus inverting the molds from the position shown in Fig. 6 to the position shown in Fig. 8. The semirevolution of the mold unit is made, however, during about half of said journey of ninety degrees, that is while the end of the rod 61 are traveling from the position shown in the right hand of Fig. 21 to the point where it reaches the end of the cam 65, then, the mold unit being inverted, the cam 64 acts on the rod 61 and opens the mold as shown at the upper right hand corner of Fig. 21.

When the molds are open they are in the position shown in Fig. 9 with the glass blank 56 suspended from the head 52 between the mold sections. As the table turns thereafter from the position shown in the upper right hand corner of Fig. 3 the reduced portion 152 of the head 52, see Fig. 9, engages the innermost arm 139 of a star wheel 140, which pushes the head 52 from one side of the mold frame out, as shown on the upper right hand corner of Fig. 3 to the left hand corner of Fig. 3. While this is taking place the star wheel 140 is pushed outwardly by the upper part of the head 152 to permit this action. The under side of the star wheel 140, near each arm, has a recess as shown in Fig. 27 for a ball 141 supported by a spring 142 in a recess 143 on the arm 144 carried by the arm 145 secured to the post 37.

As the mold unit is moved from the position shown in the right hand corner to the upper left hand corner, as shown in Fig. 22, the cam 65 closes the molds so that the glass blank is now in the blow mold 42 as shown in Fig. 10. Then the bottom of the blow mold is closed as shown in Fig. 11, by the bottom 133 being moved upward by the cam 146 at the lower right hand corner of Fig. 2, by which the pin 138 rides. The upper part of that cam is horizontal as shown, and while the pin rides across the horizontal portion of the cam the article is blown.

The head 52 and associate parts serve as a blow head for finally blowing the bottle, as well as the plunger for the blank. The spring 59 holds the plunger 58 in its upper position so as to leave an opening for the chamber 156 in the cylinder 57 to communicate with the hollow pole 158 in the mouth of the blank. An air pipe 160 and tube 161, see Fig. 4 leads to the chamber 66 and is in communication with the passageway 162 in the rod 61 and communicates with a pipe 163 connected with a tube 166 which with a valve 167 secured to and communicating with the interior of the air column 31, as seen in Fig. 1. The valve is opened by an arm 170 having a pin 171 adapted to be engaged by the cam 172 that is adjustably mounted on the plate 122 in the same way as cam 120. By this means the article is blown in its final form, as shown in Figs. 4 and 11.

The blowing takes place while the mold unit is passing from the upper left hand corner of Fig. 21 to the left hand side, caused by the cam 65 and the associate parts. After the roller 63 has left the cam 65 in passing from the left hand side of Fig. 21, it engages the cam 64 which opens the molds for discharging the finished article 175, as shown in Fig. 12. To enable the parts of the blow head to separate, the pipe 160 extends loosely through one side of the blow head 52 and screws into one side of the cylinder 57, and a stud 173 is screwed into the other side of the cylinder 57 and extends loosely through the other side of the head 52. This permits the head 52 to be spread without the cylinder 57 being separated or spread.

Immediately before the bottle 175 is discharged, however, the bottom 133 drops as the pin 138 travels down the sharp incline of the cam 176, as shown at the lower left hand corner of Fig. 1. It should have been stated before that as the pin 138 travels up the incline 146, shown at the lower right hand corner of Fig. 2, in order to close the bottom of the mold, the tube 104 on which the arm 135 is secured, is locked in its elevated position by the means shown in Figs. 14–20. As seen there the tube 104 is provided with a transverse slot or notch 177 to receive the latch 178 which is fulcrumed between its ends at 179 on the arm 180 extending from the stationary tube 105, below the bearing plate 76.

There is also a notch or transverse slot 183 in the tube 105 in which the latch 178 is located and operates, and the latch is held closed by the spring 181 connected to the tube 105 at 182. When the tube 104 is elevated so as to close the bottom of the mold, it will be automatically caught and locked as shown in Fig. 19 by the action of the spring drawing the latch into the notch 177.

This device is unlocked so as to permit the bottom to drop as shown in Fig. 12 by one end of the latch 178 being engaged by a lug 185 which is secured to the bearing plate 76, as seen in Fig. 14. This will move the latch to the position shown in Fig. 20.

After the bottle 175 has been discharged and while the mold structure is moving from the lower left hand position to the lower right hand position, the mold structure is revolved a half revolution by the downward movement of the rack 72, which is caused by the cam 77, as shown in Figs. 1 and 2. The turning movement is illustrated in Fig. 13, and when such half revolution is affected the molds will be brought into the position shown in Fig. 10, ready to receive another gather of glass in the press mold. Then the operation which has been described at length is repeated.

The invention claimed is:

1. A machine for making hollow glass ware, including a rotary table, a mold structure mounted on said table containing both a blank mold and a blow mold beside each other and said molds formed of vertical half sections separable simultaneously and in alinement with each other, a liftover means movable between the mold sections when they are separated for transferring the blank from the blank mold directly to the blow mold, and means in the path of said liftover means as it travels during the rotation of the table for causing said transfer movement.

2. A machine for making hollow glass ware, including a rotary table, a mold structure mounted on said table containing both a blank mold and a blow mold beside each other and said molds formed of vertical half sections separable simultaneously and in alinement with each other, a liftover means movable between the mold sections when they are separated for transferring the blank from the blank mold directly to the blow mold, and yieldingly rotatable means in the path of said liftover means as it travels during the rotation of the table for causing said transfer movement.

3. A machine for making hollow glass ware, including a rotary table, a mold structure mounted on said table containing both a blank mold and a blow mold beside each other and said molds formed of vertical half sections separable simultaneously and in alinement with each other, a liftover means movable between the mold sections when they are separated for transferring the blank from the blank mold directly to the blow mold, a star wheel mounted above the table in such position that an arm thereof will engage the liftover means as it travels and cause the shifting movement thereof, and means for yieldingly resisting the rotation of the star wheel.

4. A machine for making hollow glass ware, including a rotary table, a mold structure mounted on said table containing both a blank mold and a blow mold, beside each other and said molds formed of vertical half sections separable simultaneously and in alinement with each other, a liftover means movable between the mold sections when they are separated for transferring the blank from the blank mold directly to the blow mold, a star wheel mounted above the table in such position that the arm thereof would engage the liftover means as it travels and cause the shifting movement thereof, stationary means for mounting said star wheel, and a ball located between said stationary means and said star wheel adapted to engage a recess on the under side of the star wheel to yieldingly resist the rotary movement of the star wheel and to stop it.

5. A machine for making hollow glass ware, including a rotary table, blank molds mounted thereon, and a cut-off means mounted immediately over the path of the upper part of the mold for severing the glass, said cut-off means having a rotatable cutting disk and a revoluble wheel with knife edge arms radiating therefrom in position to coöperate with said cutting disk, and means actuated by the table for rotating the same.

6. A machine for making hollow glass ware, including a rotary table, blank molds mounted thereon, and a cut-off means mounted immediately over the path of the upper part of the mold for severing the glass, said cut-off means having a rotatable cutting disk and a revoluble wheel with knife edge arms radiating therefrom in position to coöperate with said cutting disk, a gear connected with said cutting wheel, a vertical shaft for causing the operation of said gear, a pin extending from said shaft, and a projection from the table for engaging said pin on the shaft and giving the parts rotary movement.

7. A machine for making hollow glass ware, including a mold structure having a rectangular frame, a press mold, a blow mold separate from, but adjacent to the press mold, each of said molds being formed of two halves adapted to separate in alinement with each other, one half of each mold being stationary in each frame, and the other halves of the two molds being simultaneously movable toward and away from the first mentioned halves for closing and opening the molds, and liftover means slidable on said molds to transfer a blank from the blank mold to the blow mold when the molds are open.

8. A machine for making hollow glass ware, including a mold structure consisting of a radially extending frame with guideways in the sides thereof, a blank mold, a blow mold, each of said molds being formed of vertical halves with a transversely rectangular rib surrounding said molds, a stationary block in one end of said frame having a rectangular recess for receiving the ribs on said molds, a companion but oppositely located block formed like the stationary block and recessed to receive the ribs of said molds and slidable in said frame, means for sliding said block for opening and closing the molds simultaneously, and a liftover slidable on the molds for transferring the blank from the blank mold to the blow mold when the molds are opened.

9. A machine for making hollow glass ware, including a rotary table, a mold holding frame mounted in said table with guideways in the sides thereof, a blank mold, a blow mold, each of said molds being formed of two vertical halves, stationary means on the outer end of said frame for securing the two outer halves of said molds, a block movable in said frame for holding the two inner halves of said molds, a rod connected with said inner block for moving the inner halves of the molds for opening and closing the molds, said block being radially slidable, and stationary cams near the center of the machine for engaging the inner end of said rod and forcing it inwardly and outwardly.

10. A machine for making hollow glass ware, including a rotary table, a mold holding frame mounted in said table with guideways in the sides thereof, a blank mold, a blow mold, each of said molds being formed of two vertical halves, stationary means on the outer end of said frame for securing the two outer halves of said molds, a block movable in said frame for holding the two inner halves of said molds, a rod connected with said inner block for moving the inner halves of the molds for opening and closing the molds, said block being radially slidable, stationary cams near the center of the machine for engaging the inner end of said rod and forcing it inwardly and outwardly, and yielding means tending to force said rod outward for yieldingly holding the mold sections closed.

11. A machine for making hollow glass ware, including a rotary table, a mold holding frame mounted in said table with guideways in the sides thereof, a blank mold, a blow mold, each of said molds being formed of two vertical halves, stationary means on the outer end of said frame for securing the two outer halves of said molds, a block movable in said frame for holding the two inner halves of said molds, a rod connected with said inner block for moving the inner halves of the molds for opening and closing the molds, said block being radially slidable, stationary cams near the central part of said machine for engaging the inner end of said rod and forcing it inward to open the molds, and a spring pressed cam near the center of said machine for engaging said rod and forcing it outwardly for closing the molds and holding them tightly closed.

12. A machine for making hollow glass ware, including a rotary table, a mold holding frame mounted in said table with guideways in the sides thereof, a blank mold, a blow mold, each of said molds being formed of two vertical halves, stationary means on the outer end of said frame for securing the two outer halves of said molds, a block movable in said frame for holding the two inner halves of said molds, a rod connected with said inner block for moving the inner halves of the molds for opening and closing the molds, said block being radially slidable, a radially yielding cam near the center of the machine for engaging said rod and forcing it outward to close the mold sections while the blank is being made, a stationary cam acting on the inner end of said rod for thereafter moving the rod inward to open the mold during the transfer of the blank from the blank mold into the blow mold, another yieldingly mounted cam acting on the inner end of said rod for forcing said rod outward during the blowing operation, and a stationary cam for engaging the inner end of said rod thereafter for moving the rod inward to open the mold for the discharge of the finished glass article.

13. A machine for making hollow glass ware, including a rotary table, a mold holding frame mounted in said table with guideways in the sides thereof, a blank mold, a blow mold, each of said molds being formed of two vertical halves, stationary means on the outer end of said frame for securing the two outer halves of said molds, a block movable in said frame for holding the two inner halves of said molds, a rod connected with said inner block for moving the inner halves of the molds for opening and closing the molds, said block being radially slidable to oppositely located yieldingly actuated cam plates at the center of the machine for engaging and forcing said rod outward for closing the mold, and two oppositely located stationary cams located in positions to engage said rod and move it inward and open the molds between the times that said rod engages the two yieldingly mounted cam plates.

14. A machine for making hollow glass ware, including a rotary mold table, a mold holding frame mounted under the table so as to turn on a radial axis and having notches in the inner end thereof, a bearing plate in the center of the table on which it rotates and of less diameter than the table and which does not extend beyond the inner end of said mold frame, a locking plunger mounted in the table in position to engage the rotating mold frame when it has been rotated and hold it in fixed position for use, a spring for forcing said plunger in locking position, a lever for releasing said locking plunger, and means on said bearing plate for engaging said lever as the table rotates and at the proper time actuating said lever to enable the mold frame to be rotated.

15. A machine for making hollow glass ware, including a rotary table, a mold holding frame mounted in said table with guideways in the sides thereof, a blank mold, a blow mold, each of said molds being formed of two vertical halves, stationary means on the outer end of said frame for securing the two outer halves of said molds, a block movable in said frame for holding the two inner halves of said molds, a rod connected with said inner block for moving the inner halves of the molds for opening and closing the molds, said block being radially slidable, said rod being tubular, cams near the center of the machine for engaging the inner end of said rod to reciprocate it for opening or closing the molds, a pinion mounted in connection with the frame of the mold structure and surrounding said rod concentrically, means for actuating said pinion for giving the mold structure rotary movement without interfering with the reciprocation of said tubular rod, and means for supplying air to the molds which is in communication with said tubular rod.

16. A machine for making hollow glass ware, including a rotary table, a mold holding frame mounted in said table with guideways in the sides thereof, a blank mold, a blow mold, each of said molds being formed of two vertical halves, stationary means on the outer end of said frame for securing the two outer halves of said molds, a block movable in said frame for holding the two inner halves of said molds, a tubular rod connected with said inner block for moving the inner halves of the molds for opening and closing the molds, cams near the center of the machine for engaging the inner end of said rod to reciprocate it for opening and closing the molds, a pinion mounted in connection with the frame of the mold structure and surrounding said rod concentrical, means for actuating said pinion for giving the mold structure rotary movement without interfering with the reciprocation of said tubular rod, a tube for conveying compressed air to the inner end of said rod, a chamber in the mold frame into which the other end of said rod projects, and a tube leading from said chamber for conveying air to the mold.

17. A machine for making hollow glass ware, including a rotary table, a mold holding frame mounted in said table with guideways in the sides thereof, a blank mold, a blow mold, each of said molds being formed of two vertical halves, stationary means on the outer end of said frame for securing the two outer halves of said molds, a block movable in said frame for holding the two inner halves of said molds, a tubular rod connected with said inner block for moving the inner halves of the molds for opening and closing the molds, cams near the center of the machine for engaging the inner end of said rod to reciprocate it for opening and closing the molds, a pinion mounted in connection with the frame of the mold structure and surrounding said rod concentrically, means for actuating said pinion for giving the mold structure rotary movement without interfering with the reciprocation of said tubular rod, a tube for conveying compressed air to the inner end of said rod, the mold frame having a chamber into which the other end of said rod projects, a tube leading from said chamber for conveying air to the mold, and a spring in said chamber acting against the inner end of said rod tending to force the movable mold section into closed position.

18. A machine for making hollow glass ware, including a blow mold formed of two vertical halves separable, a blow head for said mold formed of an inner cylinder communicating with the mouth of the mold, a surrounding cylinder, a surrounding blow head member formed of two vertical halves and each half connected with the corresponding half of the blow mold, so as to spread therewith, and means secured to the cylinder on opposite sides thereof and extending loosely through the surrounding blow head member for holding said parts of the blow head together during the separation of said surrounding members.

19. A machine for making hollow glass ware, including a blow mold formed of two vertical halves separable, a blow head for said mold formed of an inner cylinder communicating with the mouth of the mold, a surrounding cylinder, a surrounding blow head member formed of two vertical halves and each half connected with the corresponding half of the blow mold, so as to spread therewith, means secured to the cylinder on opposite sides thereof and extending loosely through the surrounding blow head member for holding said parts of the blow head together during the separation of said surrounding members, one of said means being tubular for the admission of compressed air into said cylinder, and nuts on said means for limiting the spreading movement of said surrounding member.

20. A machine for making hollow glass ware, including a vertical hollow compressed air column, a mold table rotatably mounted thereon, a valve mechanism connected with said column above the table for controlling the supply of compressed air to parts of the apparatus at desired periods in the rotation of the mold table, a stationary plate surrounding said column above said valve, and having a number of concentrically disposed slots therein, a cam, and bolts extending from the cam through said slots for adjustably locking and securing the cam on said plate in position to actuate said valve at the desired time.

21. A machine for making hollow glassware, including a mold table, a tube extending therethrough and secured thereto, a bearing plate on which the mold table rotates, a member mounted so as to be vertically reciprocable in said tube, an arm carried by said member for carrying means adapted to be applied to the end of the mold, a cam for elevating said member as the table rotates, a latch mounted in connection with said tube adapted to extend transversely through slots in said tube and vertically movable member for locking said member in its elevated position, a spring on said tube for holding the latch in locked position, and a projection from the bearing plate adapted to engage said latch and release the same for dropping said member.

In witness whereof I have hereunto affixed my signature.

EDWARD S. HUTTON.